United States Patent [19]

Heinzer

[11] 4,172,212
[45] Oct. 23, 1979

[54] SUBMARINE HOUSING FOR SUBMARINE CABLE SYSTEM REPEATER COMPONENTS OR THE LIKE

[75] Inventor: Hans E. Heinzer, Chula Vista, Calif.

[73] Assignee: International Telephone and Telegraph Corporation, New York, N.Y.

[21] Appl. No.: 927,666

[22] Filed: Jul. 24, 1978

[51] Int. Cl.² .................................................. H02G 15/14
[52] U.S. Cl. ........................... 174/50; 174/70 S; 350/96.21
[58] Field of Search ................ 174/70 S, 50, 52 S; 350/96.20, 96.21, 96.22

[56] References Cited

U.S. PATENT DOCUMENTS

| | | | |
|---|---|---|---|
| 2,155,650 | 4/1939 | Gilbert | 174/70 S |
| 2,592,780 | 4/1952 | Woods | 174/70 S X |
| 2,697,739 | 12/1954 | Presswell | 174/70 S |
| 2,894,055 | 7/1959 | Clarke et al. | 174/70 S X |
| 3,168,614 | 2/1965 | Munn et al. | 174/70 S |
| 3,201,508 | 8/1965 | Katzschner | 174/70 S X |
| 3,456,838 | 7/1969 | Chapman et al. | 174/70 S X |
| 4,029,894 | 6/1977 | Jarvis et al. | 174/70 S |
| 4,101,198 | 7/1978 | Heldt | 350/96.21 X |

*Primary Examiner*—Bruce A. Reynolds
*Assistant Examiner*—D. A. Tone
*Attorney, Agent, or Firm*—William T. O'Neil

[57] ABSTRACT

A device for use in submarine cable systems, particularly for fiber optic cable systems. A water-tight enclosure or housing is provided which is accessible for maintenance purposes. The device, which is of generally tubular shape, provides termination chambers at either end attached to bulkhead members for the introduction of cables and their mechanical termination therein. The fiber optic elements themselves are passed through the bulkhead members in penetrator subassemblies to reach the interior chamber. An axially split cylindrical shell has at least two arcuate members which fit together and nest on circumferential shoulders on the bulkhead members which have radial depths equal to the material thickness of the arcuate members. An outer sleeve slides axially over this assembly, circumferential seals providing water-tight contact between the outer sleeve and the bulkhead members. Axial pressure against the bulkhead members is resisted by axial compression of the split-shell members nested in the bulkhead member annular shoulders. Radially inwardly directed forces are resisted by the outer sleeve itself primarily. A plurality of shear bolts further fixes the outer sleeve (against tensile and torsional forces) to each of the bulkhead members.

10 Claims, 5 Drawing Figures

SUBMARINE HOUSING FOR SUBMARINE CABLE SYSTEM REPEATER COMPONENTS OR THE LIKE

BACKGROUND OF THE INVENTION

1. Field of the Invention

The invention relates to submarine enclosures for use in protecting repeater apparatus or the like, particularly in fiber optic submarine cable systems.

2. Description of the Prior Art

Although the technology specifically relating to submarine cables employing fiber optic technology is relatively new, there is a substantial amount of prior art relating to submarine enclosures for housing and protecting repeater apparatus and the like relating to submarine electric signal systems. Examples of this prior art are contained in U.S. Pat. 2,155,650; 2,697,739; 3,168,614; 3,201,508 and 3,456,838.

While the requirement for protection of electrical and electronic components within a submarine cable repeater housing is essentially the same in a fiber optic submarine cable system as in a purely electric submarine cable signal system, the interface requirement for fiber optic cable input and output interfaces are somewhat less severe than for electric cables. This is because the slightest penetration of sea water against metallic conductors can produce failure of the system because of the conductivity and inherent corrosiveness of sea water. Although it is, of course, highly desirable to prevent any intrusion of sea water into the fiber optic cable or interface with the repeater housing, the effects of such intrusion are not as immediate or disastrous as long as the sea water penetration into the repeater housing itself does not occur.

The typical prior art aforementioned either involves very complicated and expensive structures or involves permanently sealed structures, or both. A sealed structure for a repeater housing must be essentially rebuilt if it opened for any reason after its original manufacture. It is possible to construct an expendable repeater with housing, but replacement or repair is still a major operation in the typical prior art arrangement. In order to minimize interface losses, the electronic apparatus employed for a repeater in a submarine fiber optic cable arrangement should be void of optic fiber breaks and connections except at the direct input and output of the electronic apparatus of the repeater wherein an optic-fiber-to-optic-fiber connection is not involved. Moreover, a repeater enclosure for a fiber optic submarine cable system should be non-destructively accessible for maintenance or repair and should be consistent with in-line assembly. None of the prior art systems allow for practical in-line assembly, a term which will be more fully understood as this description proceeds.

The manner in which the present invention deals with the prior art disadvantages to provide a submarine housing for repeater apparatus, or the like, in a submarine fiber optic cable system will be appreciated at this description proceeds.

SUMMARY

The novel apparatus according to the invention produces a water-tight and otherwise environmentally protected interior space or cavity, into which a repeater or other apparatus may be emplaced. A pair of facing bulkhead members are arranged facing each other at the axial ends of the interior space. These bulkhead members may be joined by ancillary internal structural members for assembly convenience, or the assembly within the interior space may be effected in an assembly jig, the split cylindrical inner shell which engages annular shoulders on the facing parts of the bulkhead members serving to hold their relative positions as assembly proceeds.

Fiber optic penetrators serve to pass the optic fibers of the input and output cable or cables through the bulkhead members and into the interior space which houses the repeater or other apparatus. The so-called split cylindrical shell is comprised of at least two arcuate members which fit together along axially extending parting lines. The thickness of the material of these split-shell parts is equal to the radial depth of the annular shoulders in the inward surfaces or faces of the bulkhead members so that, with the arcuate members comprising the split cylindrical shell in place, a generally cylindrical assembly is formed having a substantially constant outside diameter. Within the relatively thick axial dimension of the bulkhead members are circumferential surface grooves into which O-ring type seals suitable for the conditions are inserted.

The final assembly step involves the sliding engagement of an outer sleeve member, which had been slipped over one of the cables associated with the housing at an early time in the assembly process such that this outer sleeve may now be emplaced by axially sliding it such that its interior surfaces at each end engage the circumferential seals in one of the bulkhead members as aforementioned.

Shear bolts may also be emplaced radially through the outer sleeve into the respective bulkhead members. These shear bolts act to complete the housing as a single-construction unit. The aforementioned shear bolts also will be seen to resist cable pulling (tension) and torsional forces which might otherwise rotate the bulkhead members with respect to the outer sleeve.

The steps of assembly will be seen to permit the conveyance of the optic fibers of input and output cables without interruption or ancillary interface structures, such that the optic fibers may interface directly with the repeater or other electronic apparatus in the interior space of the housing.

Termination chambers are provided at the outboard ends of the bulkhead members for the secure anchoring of the submarine input and output cables, for the protection of the fiber optic penetrators and for the containment of gel or other insulating shock protection and pressure equalization materials.

A sealed-in conductive penetrator or probe may also be provided through each bulkhead member so that the electronic component within the interior space may be energized through metallic jacketing or other conductive strength members which are a part of the fiber optic cable, per se.

The details of a typical implementation, according to the present invention, will be hereinafter described.

is an axially sectioned view thereof, and view (c) is an internal face thereof.

Figure 2A:
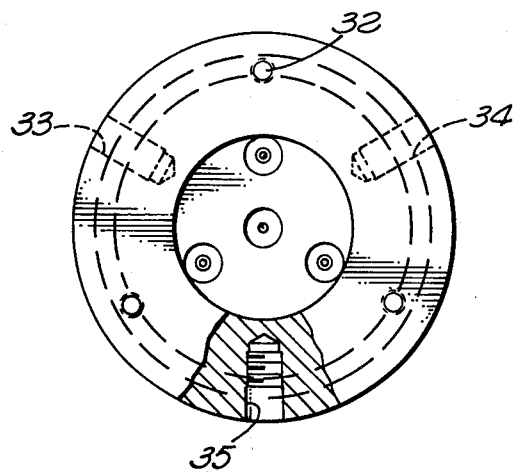
FIG. 2 is a drawing of a bulkhead member of FIG. 1 in accordance with the invention in three views. View (a) is an external face of a bulkhead member. View (b)
Figure 2B:
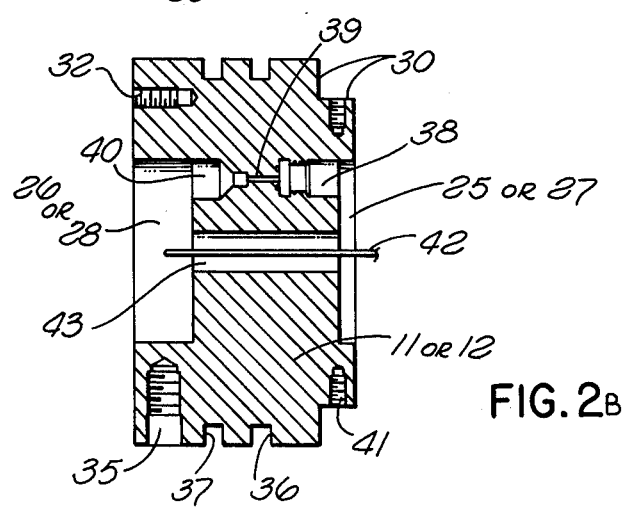
Figure 2C:
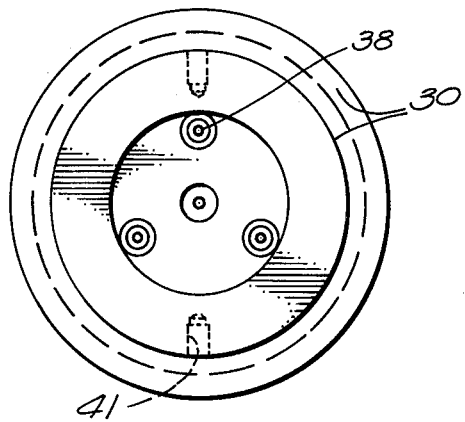
Figure 3:
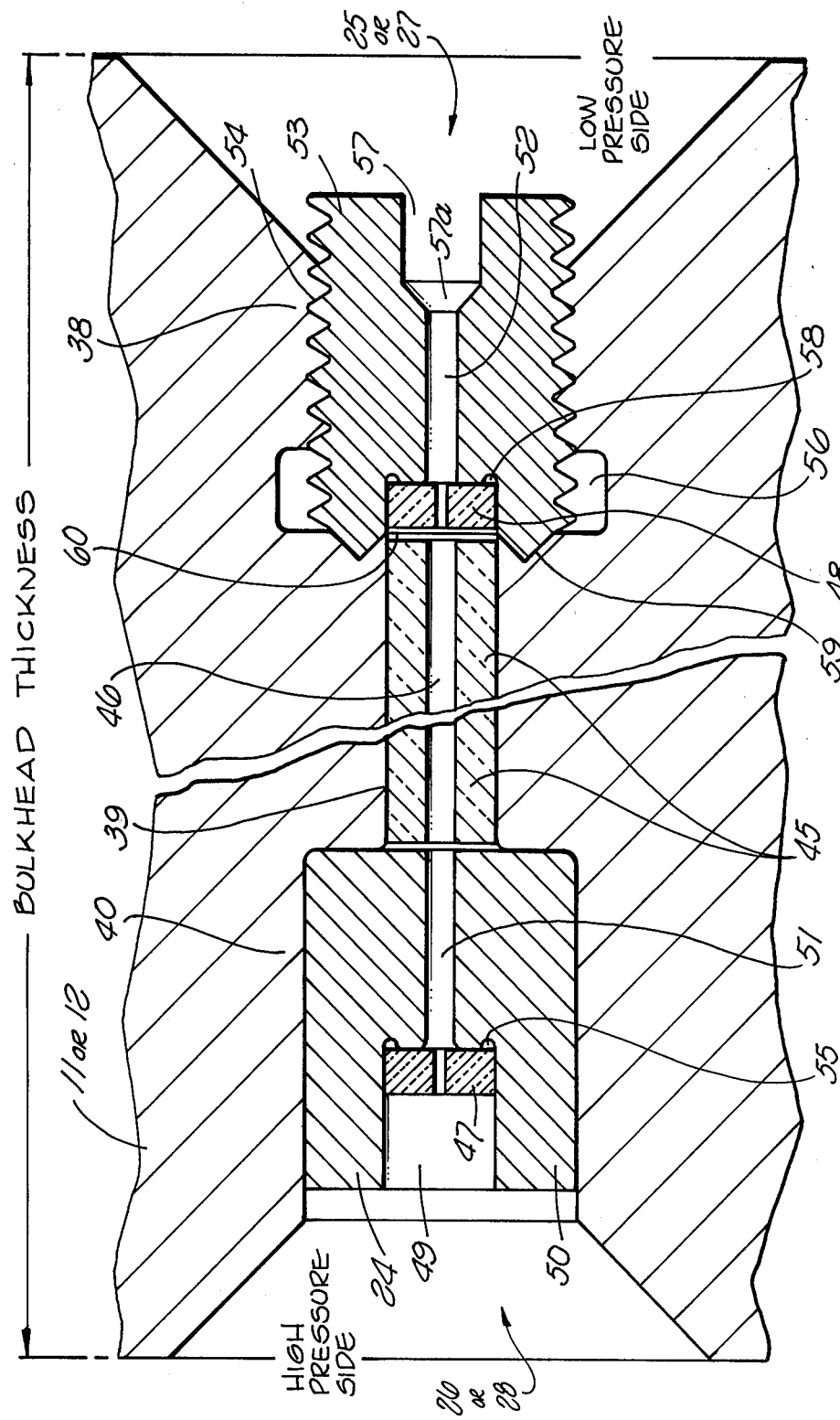

FIG. 3 is a sectioned view of a typical penetrator as also illustrated in FIG. 2.

DESCRIPTION OF A PREFERRED EMBODIMENT

Figure 1:
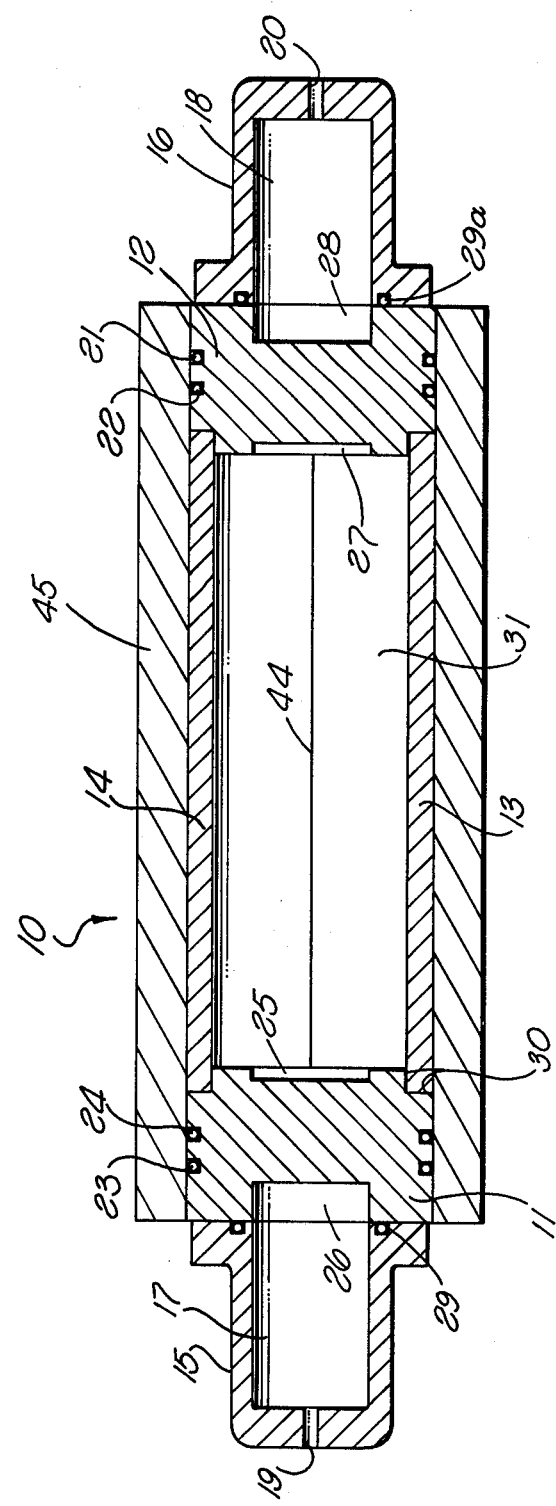
FIG. 1 is an axially sectioned view of an assembled housing in accordance with the invention, not showing the penetrators or the cable installations.

Referring now to FIG. 1, the axially sectioned view of the assembled housing is shown generally at 10. A pair of bulkhead members 11 and 12 are shown at the ends of the interior space 31. A split shell of generally cylindrical shape is provided by the two arcuate members 13 and 14. These arcuate members are each one-half of a cylindrical shell; i.e., they each have a semi-circular cross-section and join in two axially extending lines of interface, typically 44, as shown in FIG. 1. The ends of these half shells or arcuate members bear both radially and axially against the surfaces of the annular shoulders, typically 30, of both bulkhead members 11 and 12. Hydrostatic pressure against the external surfaces of 11 and 12, such as encountered in submarine service, tends to load the arcuate members 13 and 14 in axial compression, a mode in which they are particularly strong.

Each of the bulkhead members 11 and 12 includes a pair of circumferential seals of the O-ring type (specifically, 21 and 22 for bulkhead member 12; 23 and 24 for bulkhead member 11), as illustrated in FIG. 1.

An outer sleeve 45, which may be emplaced over the input or output cable during "in-line assembly", may then be axially slid into the position as illustrated in FIG. 1.

The two outer seals aforementioned (namely, 21 and 23) may be referred to as "wet" seals, in that sea water penetration would be expected to reach these seals along the fits between the outer sleeve 45 and bulkhead members 11 and 12, respectively. Seals 22 and 24, on the other hand, are normally "dry" or "back-up" seals. Depending on the magnitude of the hydrostatic pressure which the assembly will experience, it is possible that a single circumferential seal would suffice or, conversely, that one or more additional back-up seals might be required.

It will be noted that the outer sleeve 45 is depicted in FIG. 1 as being of relatively heavy wall thickness. The actual thickness of a sleeve 45 is governed by the depth of the sea water at which the entire device is to be deployed, since the radially inward pressure against the outside of the sleeve is substantially proportional thereto.

From the foregoing, it will be evident that the axial and radial loads on the entire assembly, because of hydrostatic pressure, are separately resisted by 13 and 14, and by 45, respectively.

Cable termination chambers 15 and 16 are provided for the mechanical termination and stabilization of the input and output fiber optic cables. Openings 19 and 20 are intended to accept the overall cable outside diameter including jackets and armor, as appropriate. Those mechanical strength members would normally be terminated within the termination chambers 17 and 18 by an accepted conventional means, which is not shown, since it is not a part of the present invention, per se. Referring now to FIG. 2, additional details of the assembly in FIG. 1 will be evident. FIG. 2 may be considered to be a drawing of either of the two bulkhead members of FIG. 1, since these parts may be identical or substantially identical. View (a) is the external face of a bulkhead member to which one of the termination chambers may be affixed through the use of bolts, typically at 32 in view (a). The tapped bolt receptacles, such as 33, 34 and 35, receive the shear bolts into each bulkhead member for anchoring the outer sleeve 45 thereto. It will be realized that these shear bolts provide axial stabilization of the assembly in FIG. 1 such that it is not susceptible to axial tensile forces which might otherwise pull the assembly apart. Moreover, the shear bolts resist any torsion forces which may be generated during deployment of the submarine cable system or as the results of forces encountered subsequently.

In FIG. 2, circumferential grooves, typically 36 and 37, are shown without the seals therein, but it is to be understood that these grooves accommodate the circumferential seals 21, 22, 23 and 24 contemplated in FIG. 1.

FIG. 2, view (b), shows a pair of threaded bolt sockets (of which 41 is typical), these being in the circumferential shoulder portion of each of the bulkhead members for the purpose of anchoring the split cylindrical shell members 13 and 14 thereto. Although it will be evident, if forces involved in the entire assembly are analyzed, that the bolting of these split-shell members may not be necessary, since in the finished assembly, they are constrained from any significant movement relative to the other parts.

As previously indicated, an electrical conductor-type penetrator, shown at 42 in FIG. 2, can be provided for the purpose of supplying power conveyed down the associated cables through electrically conducting ancillary parts of the cable construction to active electronic subassemblies (such as repeaters, etc.) which are to be installed in the interior space or chamber 31. Insulating insert 43 may be a thermo-setting, ceramic, or other suitable electrical insulation selected from among the conventional expedients for the structure of electrical feed-thru insulators.

FIG. 2 contemplates the use of three fiber optic penetrators in each bulkhead, these corresponding to three separate individual single optical fibers or to the redundant optical fibers of a multi-fiber cable. For purposes of the invention, the number of such fiber optic penetrators is, of course, an ordinary design variable.

At the inside and outside faces of each bulkhead member, there are inside shallow axial bores, or counterbores 25 or 27, and outside counterbores 26 or 28, into the respective inside and outside faces of each of the bulkhead members. The purpose of these recesses or counterbores is for penetrator protection and lead guidance or, in the case of the outside recesses, for the additional purposes of extending the cable termination chamber attached thereto. It will be realized that those particular details are also subject to design variation.

A typical fiber optic penetrator for conveying an optical fiber in uninterrupted form through a bulkhead member may comprise the parts 38 and 40 with the intervening fiber clearance bore 39. Such a penetrator is shown in a suitable and typical form, in copending United States patent application Ser. No. 926,514 filed July 20, 1978 and entitled, *Fiber Optic Penetrator*, and assigned to the assignee of the present application. This penetrator is basically water-tight, although a gel or potting material in the cable termination chambers 17 and 18 would be expected to provide a first line of defense against sea water penetration effective up to the outer portion of the fiber optic penetrator at 40.

Considering again FIG. 1 in conjunction with FIG. 2, the term "in-line" assembly can now be fully appreciated. In respect to the assembly of FIG. 1 without the outer sleeve 45 and before placement of the split-shell arcuate members 13 and 14, it will be noted that an uninterrupted optical fiber from either of the cables entering at 19 or 20 can be passed through a fiber optic penetrator in the bulkhead member and directly into the interior chamber 31 for direct interface with the repeater apparatus or other device therein. Thus, no dismountable or alignment-requiring connectors or interfaces are otherwise required in series with the optical fiber light-conducting circuit. In-line factory assembly thus is possible, with the final step being the placement of the split-shell members 13 and 14 at the outer sleeve 45.

Referring now to FIG. 3, the sectioned area will be understood to be bulkhead member separating one physical or chemical environment from another, such as 11 or 12 of FIG. 1. The apparatus generally identified at 38, 39 and 40 on FIG. 2 is depicted in more detail in FIG. 3. The apparatus of FIG. 3 is not specifically a part of the invention, per se, but is described for the sake of functional completeness and utility.

In FIG. 3, the left side, as the figure is viewed, is the high-pressure side, and the right side is the low-pressure side.

Materials of the same type as employed for bulkhead member 11 or 12 may also be considered suitable for the high-pressure end plug 24 and the low-pressure end plug 53.

In the illustrated example, a guide sleeve 45 fits into a first bore of diameter only slightly greater than the outside diameter of sleeve 45. The purpose of sleeve 45 is to be able to protect the optical fiber as it passes therethrough, and for that purpose, the sleeve 45 must be fabricated from a material that does not exhibit surface distortion. A quartz glass material fabricated into the tubular shape by drawing and manufactured to the indicated length has been found to provide an insert substantially devoid of surface distortion within axial passage 46. Moreover, the inside diameter through passage 46 is relatively uniform over the length of part 45.

Elements 47 and 48 are of particular importance in the construction of a penetrator according to the invention. These elements are jewel orifice members, preferably of synthetic sapphire. That particular material is known for its hardness and the fact that a bore or orifice therethrough can be produced, by conventional methods long known in the watchmaking industry, substantially free of surface irregularities, burrs and other variations which might damage an optical fiber inserted therethrough. Moreover, the characteristics of the sapphire member permit the minimizing of the clearance provided between the outside diameter of the optic fiber running therethrough and the jewel orifice itself.

It will be noted that the jewel member 47 is mounted in a bore 49 axially recessed into the plug 50, thereby mounting it with the orifice of 47 coaxial with the passages through the entire assembly (i.e., 51, 52 and 46, etc.). Since the left end of the figure represents the high-pressure side of the bulkhead and penetrator assembly, it will be understood that the hydrostatic force (of sea water, for example) from the left tends to urge the jewel member 47 against the bottom of bore 49, hence there is no tendency for it to be dislodged by that pressure.

An annular groove 55 around the bottom of bore 49 serves as a receptacle for excess quantities of adhesive sealant, the application of which will be described hereinafter, and also for extraneous particles resulting from manufacture and assembly. These particles may be very small, and in that connection, it should be pointed out that the drawing itself is much magnified for clarity, actual optic fiber diameters encountered being only a few thousandths of an inch, or typically ranging between approximately 125 and 250 microns. The jewels orifice members 47 and 48 are, therefore, correspondingly very small as compared to the magnified drawing.

From the foregoing, it will be realized that the hydrostatic pressure operates to produce a thrust force from left to right on the figure, and this force is resisted by the compression extant between 47 and the bottom of the bore 49 and between plug 50 and the bottom of the bore into which it is inserted within the bulkhead member. These parts may be referred to as the first line of defense against leakage of the penetrator.

The aforementioned thrust force obviously acts in the opposite sense in respect to plug 53 and the parts associated therewith. That is, plug 53 would tend to be expelled from the bore in which it is installed. For that reason, a threaded engagement at 54 is provided, comprising external threads on the plug and internal threads in the bore into which it is installed in bulkhead 11 or 12. The chamber 56, which is a circumferential groove provides thread relief and also a space into which particles resulting from the manufacturing operation may be contained without hazard of their causing voids or impediments to a tightly fit overall assembly.

A screw driver slot 57 for use in assembly is shown at the outer end of plug 53 and in view of the fact that even the most carefully constructed threads are not as tightly engaged as are surfaces in a sliding press-fit, for example, a circumferential ridge 59 is provided which engages a corresponding groove in the body of 11 (or 12), providing additional surface into which the adhesive sealant may be effective and also providing more precise alignment of jewel orifice member 48 with respect to passage 46 than would otherwise be possible.

It will be noted that a circumferential groove 58 is provided in connection with jewel orifice member 48 into the material of plug 53, this serving the same purpose as 55 in respect to plug 50. At 60, the inward edge of the plug 53 appears approximately centered and spaced between the inward face of jewel orifice member 48 and the right face of the quartz glass sleeve 45. Accordingly, there is no compression transmission between the glass sleeve 45 and jewel orifice member 48 or, for that matter, between plug 50 and 45.

Once the assembly has been effected in accordance with the foregoing description, an optical fiber which is essentially a continuous part of an external fiber optic cable system may be inserted, normally from the high pressure side, through the orifice in 47, the passages 51, 46, the orifice in 48, and 52, emerging in the chamfered portion 57a through plug 53. In the submarine cable application, this would be the normal direction from which the fiber optic cable would be inserted. It will be realized, however, that if the penetrator is to be used to bridge between atmospheric or other nominal gas pressure on the high-pressure side and the airless environment of outer space on the right, the optical fiber may be assembled in from the right or low-pressure side, as viewed in the figure.

Although it is not imperative that sea water be excluded from chambers 17 and 18, seals 29 and 29a may be employed to reduce penetration at the interface between 11 and 15 on the one hand and 12 and 16 on the other hand.

It may be observed that the jewel orifice member 48 constitutes a second line of defense against sea water penetration in the submarine cable application. The entire assembly is preferably completed using a somewhat resilient, bubble-free, adhesive sealant or cementing material. Such a cementing material should preferably have a shore factor of approximately 30, this being an elasticity figure of merit consistent with long-life of the assembly and resistance to at least several cycles of pressurization and depressurization over the life of the unit. Such cycles are encountered, for example, in the original deployment of a submarine cable system, its retrieval or repairs, and subsequent redeployment. Such adhesive sealants or cementing materials are applied in a highly fluid form and permitted to cure thereafter. Accordingly, they are adapted for wetting of all the inside surfaces and interfaces of the assembly through capillary action and/or vacuum impregnation. Those processes and the adhesive sealant itself are conventional and known to those with skill in the art. No critical relationships are involved in the selection of the adhesive sealant, the ordinary skill of this art being sufficient for an engineering judgment in that regard.

As hereinbefore indicated, materials exposed to the high-pressure (or, for that matter, to low-pressure) environment may be selected in accordance with conventional engineering judgments, considering also the strength requirements. One further consideration applied in respect to potential for electrolytic corrosion where the penetrator, according to the present invention, is used in an assembly where electric currents may also be passed through conductive strength members or armors of fiber optic cables which form a part of the system. Those electric currents supplied are frequently necessary (such as, for example, when the bulkhead 11 or 12 is part of the housing of a sealed repeater chamber or the like) for a submarine fiber optic cable system.

It is expected that the structural parts of the device of the invention would be fabricated from metals selected for their resistance to sea water corrosion and of appropriate strength characteristics as determined by ordinary stress analysis. The so-called O-ring type circumferential seals (of which 21, 22, 23 and 24 are typical) may be of any resilient material known in that art which is suitable for the pressure and environment conditions.

As a constructional variation, the arcuate members might be three in number as a variation, the cross-section of each being a 120° arc in that case.

From the foregoing description, the nature of the present invention may be appreciated, and various additional modifications and options will suggest themselves to those skilled in this art. Quite obviously, the interior chamber 31 might be pressurized, using an inert gas or liquid. Such an expedient can provide a reduction in the differential pressure which the structure must resist and against which the seals must be affected.

Accordingly, it is not intended that the scope of the invention be limited by the drawings or this description, these being intended as typical and illustrative only.

What is claimed is:

1. An underwater housing assembly for enclosure of an electronic repeater, or the like, in a fiber optic submarine cable system, comprising:

first and second bulkhead members including first and second cable interface means, respectively, associated with a first face of each of said bulkhead members;

means forming a circumferential shoulder about a second face of each of said bulkhead members;

an inner shell comprising at least two arcuate members which, when fitted together, form an axially split cylindrical shell engaging said circumferential shoulders to enclose an interior space having the interior cross-section of said cylindrical shell and an axial length defined by said bulkhead member second faces, the outer perimeter of said split cylindrical shell and the outer surfaces of said bulkhead members normal to said faces forming a cylindrical surface of uniform dimension;

a rigid outer sleeve slidably emplaced over said split cylindrical shell to overlap, at least partly, said outer surfaces of said bulkhead members;

and at least one circumferential seal between each of said bulkhead members and the inside surface of said outer sleeve, thereby forming an assembly resistant to external fluid pressure to protect apparatus installed within said interior space.

2. Apparatus according to claim 1 in which said cable interface means comprises a cable termination chamber attached to the first face of each of said bulkhead members, in which at least one optical cable extends externally through an opening in the wall of each of said cable termination chambers, and in which a fiber optic penetrator is provided for each optical fiber of each of said cables, said penetrator passing through the wall of the corresponding bulkhead member whereby said optic fiber passes into said interior space.

3. Apparatus according to claim 2 in which at least one electrically conductive lead is insulatingly sealed into a generally axial bore in at least one of said bulkhead members to provide electrical power for electronic apparatus within said interior space.

4. Apparatus according to claim 1 in which at least two circumferential seals axially spaced within the axial dimension of overlap of said outer sleeve with respect to each of said bulkhead members are provided, the outer of said seals at each end of said housing acting as a wet seal and those inward act as back-up seals which are normally dry.

5. Apparatus according to claim 1 in which said inner shell is further defined as comprising two of said arcuate members each in the form of a shell of semi-circular cross-section, said axially split cylindrical shell thereby having two diametrically opposite axial lines at which said two arcuate members are contiguous.

6. Apparatus according to claim 5 in which at least two circumferential seals axially spaced within the axial dimension of overlap of said outer sleeve with respect to each of said bulkhead members are provided, the outer of said seals at each end of said housing acting as a wet seal and those inward act as back-up seals which are normally dry.

7. Apparatus according to claim 5 in which said inner shell and said outer sleeve are formed of materials of strength and thickness to resist predetermined axial hydrostatic pressure on said bulkhead members and radially inward hydrostatic pressure on said outer sleeve, respectively.

8. Apparatus according to claim 1 in which said inner shell and said outer sleeve are formed of materials of strength and thickness to resist predetermined axial hydrostatic pressure on said bulkhead members and radially inward hydrostatic pressure on said outer sleeve, respectively.

9. Apparatus according to claim 1 in which removable fastening means are provided to secure said outer sleeve to said bulkhead members.

10. Apparatus according to claim 9 in which said fastening means comprises a plurality of circumferentially spaced shear bolts through said outer sleeve and into said bulkhead members.

* * * * *